US012552687B1

(12) United States Patent
Dong et al.

(10) Patent No.: US 12,552,687 B1
(45) Date of Patent: Feb. 17, 2026

(54) WASTEWATER TREATMENT DEVICE, DOCKING STATION AND CLEANING SYSTEM

(71) Applicant: TP-Link Systems Inc., Irvine, CA (US)

(72) Inventors: Xiaoming Dong, Shenzhen (CN); Ning Cheng, Shenzhen (CN)

(73) Assignee: TP-Link Systems Inc., Irvine, CA (US)

( * ) Notice: Subject to any disclaimer, the term of this patent is extended or adjusted under 35 U.S.C. 154(b) by 0 days.

(21) Appl. No.: 19/052,231

(22) Filed: Feb. 12, 2025

(51) Int. Cl.
*B08B 9/087* (2006.01)
*C02F 1/04* (2023.01)
*A47L 11/40* (2006.01)

(52) U.S. Cl.
CPC .............. *C02F 1/048* (2013.01); *B08B 9/087* (2013.01); *A47L 11/4091* (2013.01); *A47L 2201/02* (2013.01); *B08B 2209/08* (2013.01); *C02F 2303/26* (2013.01); *C02F 2307/12* (2013.01)

(58) Field of Classification Search
CPC ........ C02F 1/048; C02F 1/00; C02F 2303/26; C02F 2307/12; B01D 29/64; B01D 35/02; B08B 9/087; B08B 2209/08; B09B 3/35; B09B 3/40; B02C 18/12; B02C 18/18; B02C 18/24; B02C 18/10; F23G 7/06; A47L 11/4091; A47L 11/30; A47L 11/40; A47L 11/302; A47L 11/4016; A47L 11/4027; A47L 2201/02; A47L 2201/00
USPC ....................................................... 210/319
See application file for complete search history.

(56) References Cited

U.S. PATENT DOCUMENTS

2020/0000301 A1* 1/2020 Morin ................... A47L 9/2805
2020/0000302 A1* 1/2020 Morin ................. A47L 11/4005
2022/0338699 A1* 10/2022 Wu ...................... A47L 11/4005

FOREIGN PATENT DOCUMENTS

| CN | 212719778 | | 3/2021 | |
|---|---|---|---|---|
| CN | 216628432 | | 5/2022 | |
| CN | 216628432 | U * | 5/2022 | .............. A47L 11/30 |
| CN | 115555381 | | 1/2023 | |
| CN | 115555381 | A * | 1/2023 | ............. B02C 18/10 |

OTHER PUBLICATIONS

CN 216628432 U English description, May 31, 2022, Chen Bin et al.*
CN 115555381 A English description, Jan. 3, 2023, Wu Lincai et al.*

* cited by examiner

*Primary Examiner* — Akash K Varma
(74) *Attorney, Agent, or Firm* — Loeb & Loeb LLP

(57) ABSTRACT

A wastewater treatment device of a docking station for a cleaning robot is provided, including: a wastewater tank, wherein a bottom surface of the wastewater tank is provided with a discharge opening; a discharge channel located below the wastewater tank and in communication with the discharge opening to discharge waste generated by wastewater distillation; a waste treatment component including: a first blade disposed above the bottom surface of the wastewater tank, wherein the first blade is configured to crush waste on the bottom surface when rotating around a rotation axis; a second blade fixed relative to the first blade and at least partially located in the discharge channel, wherein the second blade is configured to crush waste on an inner wall of the discharge channel when rotating around the rotation axis.

20 Claims, 3 Drawing Sheets

WASTEWATER TREATMENT DEVICE, DOCKING STATION AND CLEANING SYSTEM

TECHNICAL FIELD

The present disclosure relates the technical field of autonomous cleaning, and specifically, to a wastewater treatment device of a docking station, a docking station for a cleaning robot and a cleaning system including a robot and a docking station for the cleaning robot.

BACKGROUND

Autonomous cleaning robots have gained widespread adoption across residential homes, offices, and industrial settings for their ability to perform sweeping and/or mopping tasks on various floor surfaces. These robots, commonly known as robotic vacuum cleaners or floor cleaners, are designed to autonomously navigate and clean designated areas before returning to their charging and docking stations. Upon completion of a cleaning cycle, the cleaning robot returns to the docking station, where it transfers the collected dry debris into a dustbin of the docking station and undergoes a cleaning process for its mopping pads.

Existing docking stations offer the convenience of automatic cleaning of the mopping pads by supplying clean water stored in a clean water tank to rinse the mopping pads and collecting the used water into a wastewater tank. However, the requirement for periodic manual replenishment of the clean water tank and emptying of the wastewater tank can be inconvenient and laborious for users, and the wastewater stored in the wastewater tank for extended periods is prone to developing unpleasant odors, which not only affects the user experience but also necessitates frequent and unpleasant cleaning tasks.

There is a need for an improved mechanism for handling the wastewater generated from cleaning the mopping pads at the docking station to enhance the user experience.

SUMMARY

In view of the above problems, according to the present disclosure, a wastewater treatment device, a docking station and a cleaning system are proposed.

According to one embodiment of the present disclosure, a wastewater treatment device of a docking station for a cleaning robot is proposed, including: a wastewater tank, wherein a bottom surface of the wastewater tank is provided with a discharge opening; a discharge channel located below the wastewater tank and in communication with the discharge opening to discharge waste generated by wastewater distillation; a waste treatment component including: a first blade disposed above the bottom surface of the wastewater tank, wherein the first blade is configured to crush waste on the bottom surface when rotating around a rotation axis; a second blade fixed relative to the first blade and at least partially located in the discharge channel, wherein the second blade is configured to crush waste on an inner wall of the discharge channel when rotating around the rotation axis.

According to another embodiment of the present disclosure, a docking station for a cleaning robot is proposed, wherein the docking station includes a wastewater treatment device, the wastewater treatment device including: a wastewater tank, wherein a bottom surface of the wastewater tank is provided with a discharge opening; a discharge channel located below the wastewater tank and in communication with the discharge opening to discharge waste generated by wastewater distillation; a waste treatment component including: a first blade disposed above the bottom surface of the wastewater tank, wherein the first blade is configured to crush waste on the bottom surface when rotating around a rotation axis; a second blade fixed relative to the first blade and at least partially located in the discharge channel, wherein the second blade is configured to crush waste on an inner wall of the discharge channel when rotating around the rotation axis.

According to another embodiment of the present disclosure, a cleaning system is proposed, including a cleaning robot and a docking station, the docking station including a wastewater treatment device, the wastewater treatment device including: a wastewater tank, wherein a bottom surface of the wastewater tank is provided with a discharge opening; a discharge channel located below the wastewater tank and in communication with the discharge opening to discharge waste generated by wastewater distillation; a waste treatment component including: a first blade disposed above the bottom surface of the wastewater tank, wherein the first blade is configured to crush waste on the bottom surface when rotating around a rotation axis; a second blade fixed relative to the first blade and at least partially located in the discharge channel, wherein the second blade is configured to crush waste on an inner wall of the discharge channel when rotating around the rotation axis.

At least according to the above embodiments of the present disclosure, a mechanism is provided to prevent the discharge opening at the bottom surface of the wastewater tank from being blocked by waste, and the use experience and service life of the corresponding wastewater treatment device, docking station and cleaning system are improved.

BRIEF DESCRIPTION OF THE DRAWINGS

The above and other objects, features and advantages of the present disclosure will become more apparent by describing embodiments of the present disclosure in more detail in conjunction with accompanying drawings. The drawings are used to provide a further understanding of the embodiments of the present disclosure and constitute a part of the specification. The drawings together with the embodiments of the present disclosure are used to explain the present disclosure, but do not constitute a limitation on the present disclosure. In the drawings, unless otherwise explicitly indicated, the same reference numerals refer to the same components, steps or elements.

DETAILED DESCRIPTION

Figure 1:
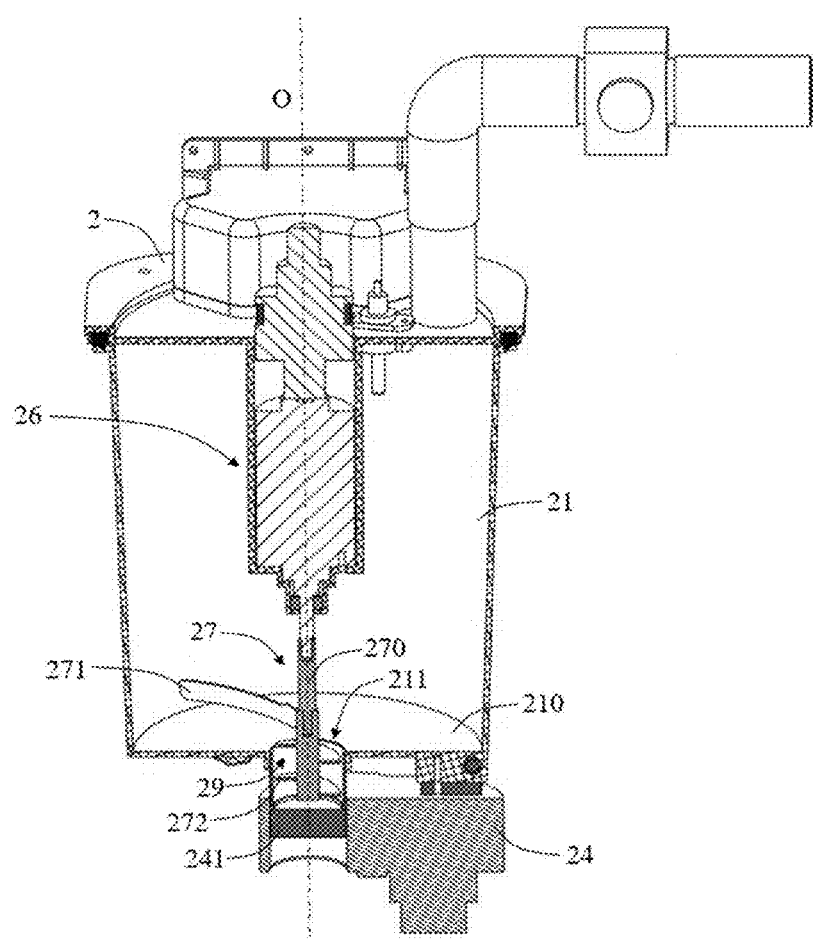
FIG. 1 is a sectional view of a wastewater treatment device according to an embodiment of the present disclosure, in which the bottom opening of the discharge channel is closed.

The technical solution of the present disclosure will be clearly and completely described below in conjunction with accompanying drawings. Obviously, the described embodiments are part of embodiments of the present disclosure, but not all of them. Based on the embodiments in the present disclosure, all other embodiments obtained by ordinary skilled in the art without making any creative efforts fall within the scope of protection of the present disclosure.

In the description of the present disclosure, it should be noted that orientations or positional relationships indicated by terms such as "center", "upper", "lower", "left", "right", "vertical", "horizontal", "top", "bottom", "internal", "external", "inside" and "outside" are based on orientations or positional relationships shown in the drawings, only for the convenience of describing the present disclosure and simplifying the description, instead of indicating or implying the indicated device or element must have a particular orientation. In addition, terms such as "first", "second" and "third" are only for descriptive purposes, and cannot be understood as indicating or implying relative importance. Likewise, words like "a", "an" or "the" do not represent a quantity limit, but represent an existence of at least one. Words like "include" or "comprise" mean that an element or an object in front of the said word encompasses those ones listed following the said word and their equivalents, without excluding other elements or objects. Words like "connect" or "link" are not limited to physical or mechanical connections, but may include electrical connections, whether direct or indirect connections.

In the description of the present disclosure, it should be noted that, unless otherwise explicitly specified and limited, terms such as "mount", "link" and "connect" should be understood in a broad sense. For example, such terms may refer to being fixedly connected, or detachably connected, or integrally connected; may refer to being mechanically connected, or electrically connected; may refer to being directly connected, or indirectly connected via an intermediate medium, or internally connected inside two elements. For ordinary skilled in the art, the meanings of the above terms in the present disclosure may be understood on a case-by-case basis.

In addition, technical features involved in different embodiments of the present disclosure may be combined with each other as long as no conflicts occurs therebetween.

Figure 2:
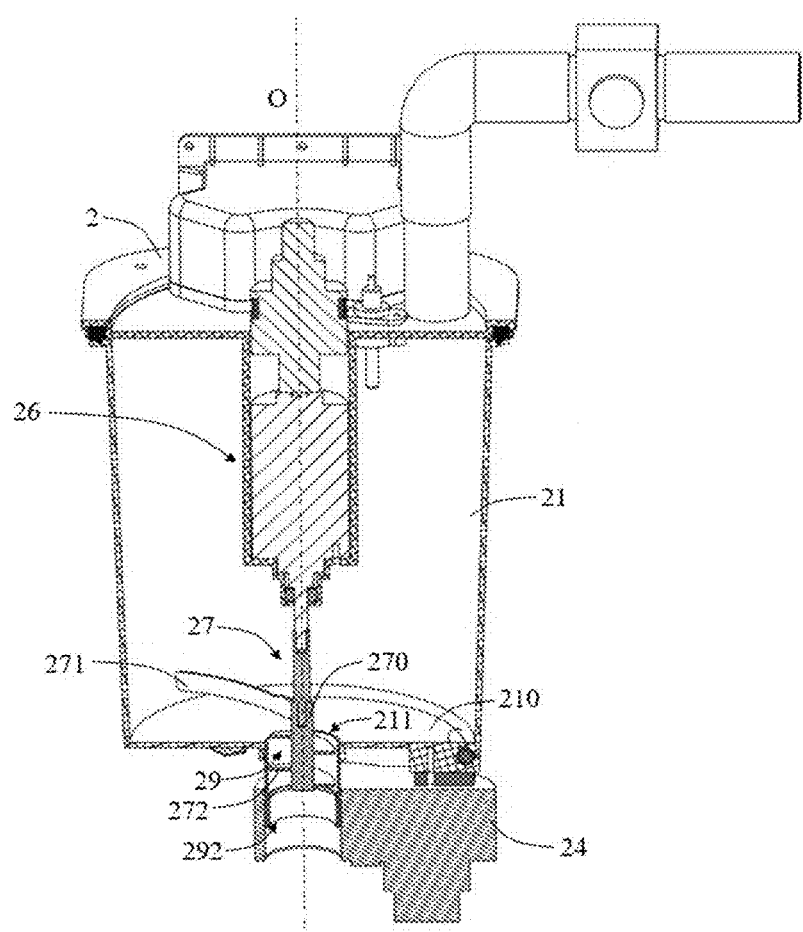
FIG. 2 is another sectional view of the wastewater treatment device according to an embodiment of the present disclosure, in which the bottom opening of the discharge channel is opened.

FIGS. 1 and 2 illustrate a wastewater treatment device 2 of a docking station for a cleaning robot according to an embodiment of the present disclosure. The cleaning robot has a mopping function, and the docking station is configured to process wastewater generated when cleaning the mopping pad on the cleaning robot. As shown in FIGS. 1 and 2, the wastewater treatment device 2 includes a wastewater tank 21 to collect wastewater generated when cleaning the mopping pad on the cleaning robot, and the wastewater tank 21 may be heated to distill the wastewater contained therein. The water vapor generated through wastewater distillation may be condensed after leaving the wastewater tank 21 through an exhaust hole on top of the wastewater tank 21. The clean water obtained through condensation may be provided to the cleaning robot for subsequent mopping tasks. Waste generated by wastewater distillation temporarily stays in the wastewater tank 21 during the distillation process, and mostly solidifies on the bottom of the wastewater tank 21. As shown in FIGS. 1 and 2, the bottom surface 210 of the wastewater tank 21 is provided with a discharge opening 211 to discharge waste generated by wastewater distillation. For example, the wastewater tank 21 may have a substantially cylindrical shape, the bottom surface 210 may have a substantially circular shape in a top view, and the discharge opening 211 may be arranged at the center of the bottom surface 210.

As shown in FIGS. 1 and 2, the wastewater treatment device 2 further includes a discharge channel 29, which is located below the wastewater tank 21 and in communication with the discharge opening 211. Waste passing through the discharge opening 211 moves away from the wastewater tank 21 via the discharge channel 29.

As shown in FIGS. 1 and 2, the wastewater treatment device 2 further includes a driving mechanism 26 and a waste treatment component 27. The driving mechanism 26 includes, for example, a motor. An output shaft of the motor may drive the waste treatment component 27 to rotate around a rotation axis O. According to FIGS. 1 and 2, the waste treatment component 27 includes a rod-shaped body 270, a first blade 271 and a second blade 272. The rod-shaped body 270 extends from the inside of the wastewater tank 21 into the discharge channel 29 along the rotation axis O, and is configured to rotate around the rotation axis O. According to an embodiment of the present disclosure, the upper end of the rod-shaped body 270 may be fixedly connected to the output shaft of the motor. Thereby, the motor drives the rod-shaped body 270 to rotate around the rotation axis O. According to an embodiment of the present disclosure, the rotation axis O may be the central axis of the wastewater tank 21, and the rod-shaped body 270 is located above the discharge opening 211.

The first blade 271 and the second blade 272 are fixedly connected to the rod-shaped body 270. With the waste treatment component 27 mounted in the wastewater tank 21, the first blade 271 is located above the bottom surface 210 of the wastewater tank 21. The first blade 271 may be arranged near the bottom surface 210 of the wastewater tank 21 in the direction along the rotation axis O (for example, in the vertical direction in FIG. 1). When the first blade 271 rotates around the rotation axis O with the rod-shaped body 270, the first blade 271 crushes the waste formed on the bottom surface 210. In addition, with the waste treatment component 27 mounted in the wastewater tank 21, the second blade 272 fixed to the rod-shaped body 270 is at least partially located in the discharge channel 29. When the second blade 272 rotates around the rotation axis O with the rod-shaped body 270, the second blade 272 crushes the waste formed on the inner wall of the discharge channel 29.

Therefore, when the waste treatment component 27 is driven by the motor to rotate, waste on the bottom surface 210 of the wastewater tank 21 and waste on the inner wall of the discharge channel 29 are both crushed. Further, the crushed waste on the bottom surface 210 may be sent into the discharge channel 29, and may be sent out of the discharge channel 29 together with the waste formed in the discharge channel 29, so that the discharge channel 29 is not blocked. Thereby, in subsequent cycles of distillation treatment, heat transfer to the wastewater in the wastewater tank 21 will not be affected, as little or no waste remains on the bottom surface 210.

As shown in FIGS. 1 and 2, the inner wall of the discharge channel 29 may have a shape that is symmetrical with respect to the rotation axis O, and this shape may correspond to a shape generated by the rotation of the second blade 272 with respect to the rotation axis O. Thus, most areas of the inner wall of the discharge channel 29, or the entire inner wall, may be cleaned by the second blade 272. Further, referring also to FIG. 3, the second blade 272 may be a spiral-shaped blade extending spirally around the rotation axis O.

The spiral-shaped second blade 272 further promotes the crushing of the waste on the inner wall of the discharge channel 29, as well as the transferring of waste out of the discharge channel 29. For example, in the embodiment shown in FIGS. 1 and 2, the waste treatment component 27 is configured to rotate counterclockwise from a top view of the wastewater tank 21. Under this condition, the radially outer edge of the spiral-shaped second blade 272 exerts a force on the waste consolidated on the inner wall of the discharge channel 29. The force exerted has a component in the rotation direction and a component in the vertical downward direction, which facilitates scraping off the waste consolidated on the inner wall. The waste that has been scraped off, together with waste entering the discharge channel 29, may fall onto the upper surface of the spiral-shaped second blade 272. In a condition where the second blade 272 rotates counterclockwise continuously, there may be a speed difference between the upper surface of the second blade 272 and the waste on it. This speed difference may be increased due to the gravity subjected to by the waste and the friction on the waste from the inner wall of the discharge channel 29. Thereby, with respect to a static coordinate system (for example, with respect to the wastewater tank 21), the waste on the upper surface of the second blade 272 has a velocity with a downward component in the vertical direction. That is, the waste on the upper surface of the second blade 272 may move downwards and finally leave the discharge channel 29 from the bottom opening 292 of the discharge channel 29.

According to an embodiment of the present disclosure, the helix angle at which the second blade 272 spirally extend around the rotation axis O may be greater than 0 degree and less than or equal to 80 degrees, so as to promote the crushing and the conveying of solid waste and allow the second blade 272 to be more stable during the rotation. For example, the helix angle is greater than 0 degree and less than or equal to 45 degrees, so as to facilitate the conveying of the solid waste. For example, the helix angle is between 45 degrees and 80 degrees, so as to facilitate the crushing of the solid waste. According to another embodiment of the present disclosure, the helix angle is between 20 degrees and 45 degrees. According to an embodiment of the present disclosure, the second blade 272 extends spirally around the rod-shaped body 270 for at least two turns, so that its structure is more stable and not easy to be damaged.

With continued reference to FIGS. 1 and 2, a top portion 2721, such as a top edge, of the second blade 272 may be higher than the discharge opening 211 of the wastewater tank 21 in the vertical direction. Therefore, the waste moved to the discharge opening 211 may be contacted by the top portion of the second blade 272 and moved to the upper surface of the second blade 272, which facilitates the waste to enter the discharge channel 29.

FIGS. 1 and 2 also show a valve 24 of the wastewater treatment device 2. The valve 24 is provided near the discharge channel 29 to open or close the discharge channel 29. For example, a valve element 241 of the valve 24 may be disposed outside (i.e., the lower side in the figure) the bottom opening 292 of the discharge channel 29 to open and close the bottom opening 292. For example, the valve element 241 may be of a plate shape and able to translate in a plane of the plate. With this arrangement, the bottom portion 2722 of the second blade 272 may be located near the bottom opening 292, for example, located adjacent to a plane where the bottom opening 292 is located. Thus, in a condition where the valve element 241 closes the bottom opening 292, the rotation of the second blade 272 around the rotation axis O may at least partially crush the waste on the upper surface of the valve element 241, thus alleviating additional resistance to opening and closing the valve element 241 caused by the waste.

Figure 3:
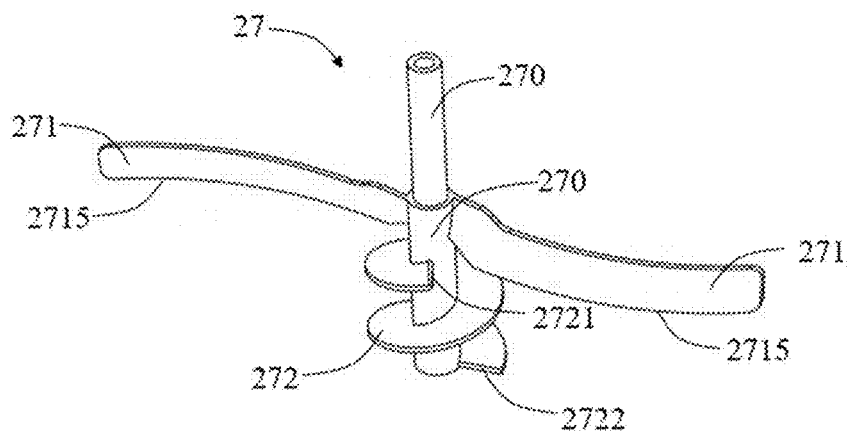
FIG. 3 is a perspective view of the waste treatment component of the wastewater treatment device according to an embodiment of the present disclosure.
Figure 4:
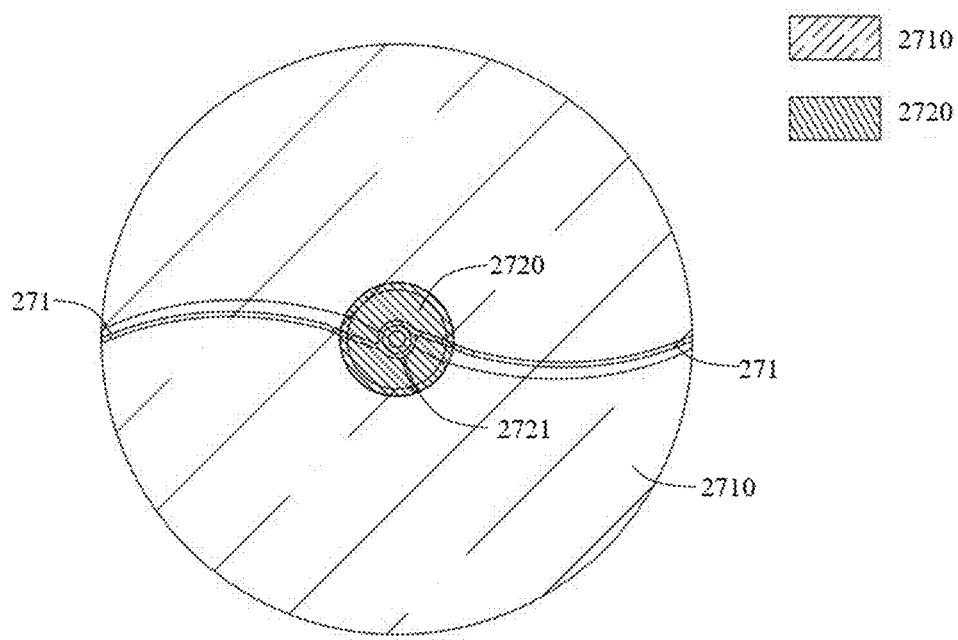
FIG. 4 is a schematic view showing a first annular region swept over by the working edge due to the rotation of the first blade and a second annular region swept over by the second blade due to the rotation of the second blade in the wastewater treatment device according to an embodiment of the present disclosure.

Referring to FIGS. 3 and 4, a working surface of the first blade 271 configured to push waste on the bottom surface 210 is a concave and curved surface. Specifically, the first blade 271 extends from the rod-shaped body 270 away from the rotation axis O, and has a curved shape in a cross section orthogonal to the rotation axis O. In addition, compared with the middle section of the first blade 271, the end of the first blade 271 away from the rotation axis O is located forward in the predetermined rotation direction of the first blade 271. In other words, the first blade 271 may bend in the predetermined rotation direction while extending away from the rotation axis O to form the curved shape. The curved shape thus formed facilitates to push the crushed waste toward the discharge opening 211.

Further referring to FIG. 3, it shows a working edge 2715 of a first blade 271, which is arranged near the bottom surface 210 of the wastewater tank 21. As shown in FIG. 4, the working edge 2715 sweeps over a first annular region 2710 when the first blade 271 rotates around the rotation axis O. The second blade 272 sweeps over a second annular region 2720 when the second blade rotates around the rotation axis O. FIG. 4 shows an overlapping region between the first annular region 2710 and the second annular region 2720. In other words, the inner radius of the first annular region 2710 is smaller than the outer radius of the second annular region 2720. Therefore, it is ensured that the waste pushed to the discharge opening 211 by the first blade 271 may be contacted by the second blade 272 and then transported into the discharge channel 29. In addition, the outer radius of the first annular region 2710 may be slightly smaller than the radius of the bottom surface 210, so as to maximize the area may be cleaned on the bottom surface 210 without affecting the rotation of the first blade 271. Further, as shown in FIGS. 3 and 4, the waste treatment component 27 may include two first blades 271. The respective working edge 2715 of the two first blades 271 are located at the same height relative to the bottom surface 210, thereby ensuring a certain efficiency for crushing the waste while reducing the manufacturing cost. According to another embodiment of the present disclosure, the waste treatment component 27 may include more than two first blades 271.

According to an embodiment of the present disclosure, the first blade 271 and the second blade 272 are fixed relative to each other. For example, the first blade 271 and the second blade 272 are both fixed to the rod-shaped body 270, thereby forming a single component. According to another embodiment of the present disclosure, the rod-shaped body 270, the first blade 271 and the second blade 272 may be integrally formed. For example, the rod-shaped body 270, the first blade 271 and the second blade 272 may all be made of stainless steel to ensure the strength, heat resistance and corrosion resistance. According to other embodiments of the present disclosure, the rod-shaped body 270, the first blade 271 and the second blade 272 may be assembled with each other, and each component may be formed by assembling a plurality of parts to meet specific manufacturing requirements.

According to an embodiment of the present disclosure, the waste treatment component 27 may continuously rotate when the wastewater tank 21 performs the distillation process and after the distillation process is completed. For example, a treatment process of wastewater in the wastewater tank 21 may be as follows. In a first step, with wastewater collected in the wastewater tank 21 and the bottom opening 292 of the discharge channel 29 closed, the wastewater tank 21 is heated to a first temperature, and the waste treatment component 27 is driven to rotate around the rotation axis O, so as to stir the wastewater. The stirring of the wastewater speeds up distillation and prevents lumping of the waste. The first step may continue until most of the moisture in the wastewater is evaporated, for example, when the temperature in the wastewater tank 21 further rises and triggers an anti-dry burning sensor. Then, in a second step, the bottom opening 292 of the discharge channel 29 is kept closed, and the wastewater tank 21 is heated at a second temperature which is lower than the first temperature. For example, the second temperature is 50 degrees Celsius. Such operation prevents water vapor from condensing and wetting the inner wall of the wastewater tank 21, and ensures the drying of waste. In the second step, the waste treatment component 27 is continuously driven to rotate around the rotation axis O, so as to crush the waste and push the crushed waste into the discharge channel 29. The second step may continue until the little or no moisture remains in the waste, i.e., the waste is dry. At the end of the second step, most of the waste formed on the bottom surface 210 has been crushed and pushed into the discharge channel 29. Then, in a third step, the bottom opening of the discharge channel 29 is opened, and the waste treatment component 27 is driven to rotate around the rotation axis O, so that the waste in the discharge channel 29 may be discharged from the bottom opening. In addition, the waste remaining on the bottom surface 210, if there is any, may also be pushed to and discharged through the discharge channel 29. The wastewater treatment device 2 with the above arrangement may further reduce the difficulty of operation for each component when processing the waste, and the waste may be discharged from the wastewater tank 21 more easily. However, according to other embodiments of the present disclosure, it is also possible to realize the distillation process with different steps by using the components of the wastewater treatment device 2 described above.

According to one or more embodiments of the present disclosure, the present disclosure may be implemented at least as follows.

Item 1: A wastewater treatment device of a docking station for a cleaning robot, including: a wastewater tank, wherein a bottom surface of the wastewater tank is provided with a discharge opening; a discharge channel located below the wastewater tank and in communication with the discharge opening to discharge waste generated by wastewater distillation; a waste treatment component including: a first blade disposed above the bottom surface of the wastewater tank, wherein the first blade is configured to crush waste on the bottom surface when rotating around a rotation axis; a second blade fixed relative to the first blade and at least partially located in the discharge channel, wherein the second blade is configured to crush waste on an inner wall of the discharge channel when rotating around the rotation axis.

Item 2: The wastewater treatment device according to Item 1, wherein the inner wall of the discharge channel has a shape symmetrical with respect to the rotation axis, and the second blade is a spiral-shaped blade extending spirally around the rotation axis.

Item 3: The wastewater treatment device according to Item 2, wherein the second blade extends around the rotation axis spirally at a helix angle that is greater than 0 degree and less than or equal to 80 degrees.

Item 4: The wastewater treatment device according to any one of items 1 to 3, wherein a top portion of the second blade is higher than the discharge opening in a vertical direction.

Item 5: The wastewater treatment device according to any one of items 1 to 4, wherein a working surface of the first blade configured to push waste is a concave and curved surface.

Item 6: The wastewater treatment device according to any one of items 1 to 5, wherein the first blade has a working edge near the bottom surface of the wastewater tank, wherein an inner radius of a first annular region swept over by the working edge due to the rotation of the first blade is smaller than an outer radius of a second annular region swept over by the second blade due to the rotation of the second blade.

Item 7: The wastewater treatment device according to any one of items 1 to 6, wherein the waste treatment component includes at least one additional first blade fixed relative to the first blade and configured to rotate around the rotation axis with the first blade.

Item 8: The wastewater treatment device according to any one of items 1 to 7, wherein the waste treatment component includes a rod-shaped body extending from interior of the wastewater tank into the discharge channel along the rotation axis and configured to rotate around the rotation axis, the first blade and the second blade fixedly connected to the rod-shaped body.

Item 9: The wastewater treatment device according to any one of items 1 to 8, wherein the rod-shaped body, the first blade and the second blade are integrally formed.

Item 10: The wastewater treatment device according to any one of items 1 to 9, wherein the rod-shaped body, the first blade and the second blade are made of stainless steel.

Item 11: The wastewater treatment device according to any one of items 1 to 10, further including a valve, wherein a valve element of the valve is arranged outside a bottom opening of the discharge channel to open and close the bottom opening, wherein a bottom portion of the second blade is arranged close to the bottom opening.

Item 12: The wastewater treatment device according to any one of items 1 to 11, wherein the wastewater treatment device is configured to perform following steps: step 1: heating the wastewater tank at a first temperature and driving the waste treatment component to rotate around the rotation axis, in a condition where a bottom opening of the discharge channel is closed; step 2: heating the wastewater tank at a second temperature lower than the first temperature and driving the waste treatment component to rotate around the rotation axis, in a condition where the bottom opening of the discharge channel is closed; step 3: opening the bottom opening of the discharge channel and driving the waste treatment component to rotate around the rotation axis.

Item 13: A docking station for a cleaning robot, wherein the docking station includes a wastewater treatment device, the wastewater treatment device including: a wastewater tank, wherein a bottom surface of the wastewater tank is provided with a discharge opening; a discharge channel located below the wastewater tank and in communication with the discharge opening to discharge waste generated by wastewater distillation; a waste treatment component including: a first blade disposed above the bottom surface of the wastewater tank, wherein the first blade is configured to crush waste on the bottom surface when rotating around a rotation axis; a second blade fixed relative to the first blade and at least partially located in the discharge channel, wherein the second blade is configured to crush waste on an inner wall of the discharge channel when rotating around the rotation axis.

Item 14: The docking station according to item 13, wherein the inner wall of the discharge channel has a shape symmetrical with respect to the rotation axis, and the second blade is a spiral-shaped blade extending spirally around the rotation axis.

Item 15: The docking station according to item 13 or 14, wherein a top portion of the second blade is higher than the discharge opening in a vertical direction.

Item 16: The docking station according to any one of items 13 to 15, wherein a working surface of the first blade configured to push waste is a concave and curved surface.

Item 17: The docking station according to any one of items 13 to 16, wherein the first blade has a working edge near the bottom surface of the wastewater tank, wherein an inner radius of a first annular region swept over by the working edge due to the rotation of the first blade is smaller than an outer radius of a second annular region swept over by the second blade due to the rotation of the second blade.

Item 18: A cleaning system including a cleaning robot and a docking station, the docking station including a wastewater treatment device, the wastewater treatment device including: a wastewater tank, wherein a bottom surface of the wastewater tank is provided with a discharge opening; a discharge channel located below the wastewater tank and in communication with the discharge opening to discharge waste generated by wastewater distillation; a waste treatment component including: a first blade disposed above the bottom surface of the wastewater tank, wherein the first blade is configured to crush waste on the bottom surface when rotating around a rotation axis; a second blade fixed relative to the first blade and at least partially located in the discharge channel, wherein the second blade is configured to crush waste on an inner wall of the discharge channel when rotating around the rotation axis.

Item 19: The cleaning system according to item 18, wherein the inner wall of the discharge channel has a shape symmetrical with respect to the rotation axis, and the second blade is a spiral-shaped blade extending spirally around the rotation axis.

Item 20: The cleaning system according to item 18 or 19, wherein the first blade has a working edge near the bottom surface of the wastewater tank, wherein an inner radius of a first annular region swept over by the working edge due to the rotation of the first blade is smaller than an outer radius of a second annular region swept over by the second blade due to the rotation of the second blade.

The present disclosure has been described in detail above, but it is obvious to those skilled in the art that the present disclosure is not limited to the embodiments described in the disclosure. The present disclosure may be implemented as a modified and changed form without departing from the spirit and scope of the present disclosure defined by the description of the claims. Therefore, the description in the disclosure is for illustration and does not have any limiting meaning to the present disclosure.

What is claimed is:

1. A wastewater treatment device of a docking station for a cleaning robot comprising:
    a wastewater tank, wherein a bottom surface of the wastewater tank comprises a discharge opening;
    a discharge channel disposed below the wastewater tank and in communication with the discharge opening to discharge waste generated by wastewater distillation;
    a waste treatment component comprising:
        a first blade disposed above the bottom surface of the wastewater tank, wherein the first blade is configured to crush the waste on the bottom surface when rotating around a rotation axis;
        a second blade fixed relative to the first blade and at least partially disposed in the discharge channel, wherein the second blade is configured to crush the waste on an inner wall of the discharge channel when rotating around the rotation axis.

2. The wastewater treatment device according to claim 1, wherein the inner wall of the discharge channel comprises a shape symmetrical with respect to the rotation axis, and the second blade comprises a spiral-shaped blade extending spirally around the rotation axis.

3. The wastewater treatment device according to claim 2, wherein the second blade extends around the rotation axis spirally at a helix angle that is greater than 0 degree and less than or equal to 80 degrees.

4. The wastewater treatment device according to claim 1, wherein a top portion of the second blade is higher than the discharge opening in a vertical direction.

5. The wastewater treatment device according to claim 1, wherein a working surface of the first blade configured to push the waste comprises a concave and curved surface.

6. The wastewater treatment device according to claim 1, wherein the first blade has a working edge near the bottom surface of the wastewater tank, wherein an inner radius of a first annular region swept over by the working edge due to the rotation of the first blade is smaller than an outer radius of a second annular region swept over by the second blade due to the rotation of the second blade.

7. The wastewater treatment device according to claim 1, wherein the waste treatment component comprises at least one additional first blade fixed relative to the first blade, and wherein the at least one additional first blade is configured to rotate around the rotation axis with the first blade.

8. The wastewater treatment device according to claim 1, wherein the waste treatment component comprises a rod-shaped body extending from interior of the wastewater tank into the discharge channel along the rotation axis, the rod-shaped body configured to rotate around the rotation axis, wherein the first blade and the second blade fixedly connected to the rod-shaped body.

9. The wastewater treatment device according to claim 8, wherein the rod-shaped body, the first blade and the second blade are integrally formed.

10. The wastewater treatment device according to claim 8, wherein the rod-shaped body, the first blade and the second blade comprise stainless steel.

11. The wastewater treatment device according to claim 1, further comprising a valve, wherein a valve element of the valve is arranged outside a bottom opening of the discharge channel to open and close the bottom opening, wherein a bottom portion of the second blade is arranged close to the bottom opening.

12. The wastewater treatment device according to claim 1, wherein the wastewater treatment device is configured to perform following steps:
    step 1: heating the wastewater tank at a first temperature and driving the waste treatment component to rotate around the rotation axis, in a condition where a bottom opening of the discharge channel is closed;
    step 2: heating the wastewater tank at a second temperature lower than the first temperature and driving the waste treatment component to rotate around the rotation axis, in a condition where the bottom opening of the discharge channel is closed;

step 3: opening the bottom opening of the discharge channel and driving the waste treatment component to rotate around the rotation axis.

13. A docking station for a cleaning robot, wherein the docking station comprises a wastewater treatment device, the wastewater treatment device comprising:
    a wastewater tank, wherein a bottom surface of the wastewater tank comprises a discharge opening;
    a discharge channel disposed below the wastewater tank and in communication with the discharge opening to discharge waste generated by wastewater distillation;
    a waste treatment component comprising:
    a first blade disposed above the bottom surface of the wastewater tank, wherein the first blade is configured to crush the waste on the bottom surface when rotating around a rotation axis;
    a second blade fixed relative to the first blade and at least partially disposed in the discharge channel, wherein the second blade is configured to crush the waste on an inner wall of the discharge channel when rotating around the rotation axis.

14. The docking station according to claim 13, wherein the inner wall of the discharge channel comprises a shape symmetrical with respect to the rotation axis, and the second blade comprises a spiral-shaped blade extending spirally around the rotation axis.

15. The docking station according to claim 13, wherein a top portion of the second blade is higher than the discharge opening in a vertical direction.

16. The docking station according to claim 13, wherein a working surface of the first blade configured to push the waste comprises a concave and curved surface.

17. The docking station according to claim 13, wherein the first blade has a working edge near the bottom surface of the wastewater tank, wherein an inner radius of a first annular region swept over by the working edge due to the rotation of the first blade is smaller than an outer radius of a second annular region swept over by the second blade due to the rotation of the second blade.

18. A cleaning system comprising a cleaning robot and a docking station, the docking station comprising a wastewater treatment device, the wastewater treatment device comprising:
    a wastewater tank, wherein a bottom surface of the wastewater tank is provided with a discharge opening;
    a discharge channel located below the wastewater tank and in communication with the discharge opening to discharge waste generated by wastewater distillation;
    a waste treatment component comprising:
    a first blade disposed above the bottom surface of the wastewater tank, wherein the first blade is configured to crush the waste on the bottom surface when rotating around a rotation axis;
    a second blade fixed relative to the first blade and at least partially located in the discharge channel, wherein the second blade is configured to crush the waste on an inner wall of the discharge channel when rotating around the rotation axis.

19. The cleaning system according to claim 18, wherein the inner wall of the discharge channel comprises a shape symmetrical with respect to the rotation axis, and the second blade comprises a spiral-shaped blade extending spirally around the rotation axis.

20. The cleaning system according to claim 18, wherein the first blade has a working edge near the bottom surface of the wastewater tank, wherein an inner radius of a first annular region swept over by the working edge due to the rotation of the first blade is smaller than an outer radius of a second annular region swept over by the second blade due to the rotation of the second blade.

* * * * *